Nov. 24, 1931. N. J. E. HELLSTRÖM 1,833,748
FUEL INJECTING DEVICE FOR INTERNAL COMBUSTION ENGINES
Filed Feb. 19, 1930
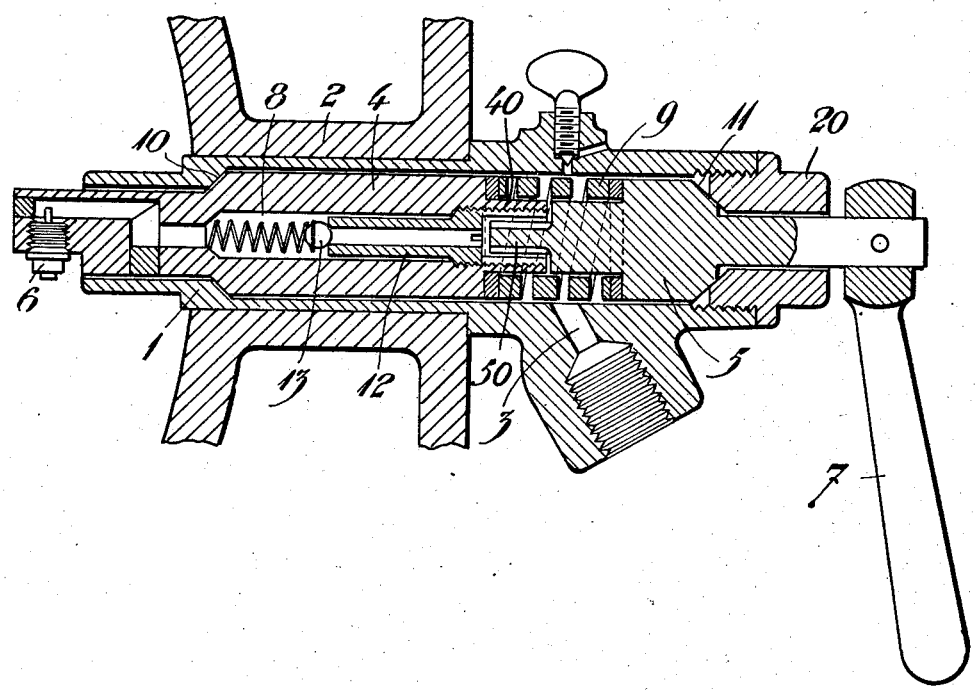

Patented Nov. 24, 1931

1,833,748

UNITED STATES PATENT OFFICE

NILS JOHAN ENOCH HELLSTRÖM, OF TROLLHATTAN, SWEDEN

FUEL INJECTING DEVICE FOR INTERNAL COMBUSTION ENGINES

Application filed February 19, 1930, Serial No. 429,694, and in Sweden January 31, 1929.

This invention relates to fuel injecting devices for internal combustion engines and particularly to that type of such devices which comprises a non-rotatable casing to be inserted into the wall of the combustion chamber of the engine and a stem rotatably mounted in said casing which carries a spraying nozzle and is formed with a fuel passage communicating with the discharge orifice or orifices of said nozzle and which is supplied with fuel through an inlet passage formed in the casing.

The invention has for its purpose to provide an injecting device of the above said type in which the stem is mounted in the casing in such a way as positively to prevent leakage between the stem and the casing in the direction towards the combustion chamber as well as in the direction towards the atmosphere.

The invention is characterized, chiefly, by the fact that the rotatable stem comprises two parts longitudinally movable relatively to each other and provided with suitable packing surfaces at opposite sides of the fuel inlet of the casing. In order to produce the necessary packing pressure a spring is inserted between the two parts of the stem to press said packing surfaces against seats formed in the casing.

In the drawing a longitudinal section of a fuel injecting device embodying this invention is shown.

With reference to the drawing, the numeral 1 indicates a sleeve adapted to be non-rotatably inserted in the wall 2 of the combustion chamber of an internal combustion engine. The sleeve 1 is formed with a fuel inlet at 3. Rotatably mounted in the sleeve 1 is a stem comprising two parts 4, 5 lying in alinement and so connected to each other as to be capable of longitudinal displacement relatively to each other, while being prevented from rotation with respect to each other. The part 4 adjacent the combustion chamber carries a spraying nozzle 6 which may be directed to the side, as shown, or in any oblique position, as may be desired or required. The other part 5 of the stem carries a handle 7. The part 4 is formed with a longitudinally through extending fuel passage 8. The above said connection between the parts 4 and 5 is effected by engagement between a reduced end portion 50 of the part 5 formed with longitudinal ribs and a sleeve shaped end portion 40 of the part 4 formed with corresponding grooves. Formed in the parts 4 and 5 in communication with the inlet 3 is a circular groove to receive a helical spring of high tension 9 tending to displace the parts 4 and 5 away from each other. The parts 4 and 5 are formed with conical ends 10, 11, respectively, near the respective ends of the sleeve to serve as packing surfaces in cooperation with corresponding conical seats 10, 11 formed in the sleeve 1 and on an end plug 20 of the sleeve, respectively. The parts 4, 5 are pressed against said seats due to the action of the spring 9 inserted between the parts 4 and 5.

Provided at the ends of the parts 4, 5 facing each other is a sufficient play to allow free entrance of the fuel from inlet 3 to passage 8 and to allow the parts 4 and 5 to adjust themselves relative to their respective seats independently of each other. This will secure a positive sealing effect so as to prevent leakage both inwardly towards the combustion chamber and outwardly towards the atmosphere.

In order to prevent return flow of fuel the passage 8 is provided with a non return valve comprising a pipe 12 inserted in the passage 8 and a spring loaded ball 13 engaging the end of said pipe.

What I claim is:—

1. A fuel injecting device for internal combustion engines, comprising a sleeve shaped casing having seats at opposite sides of a fuel inlet, a stem rotatably mounted in said casing, said stem comprising two parts lying in alinement and each part adapted to engage one of said seats, a connection between said parts to permit them to be displaced longitudinally relatively to each other, a spring inserted between the parts of the stem to press them against their respective seats, a handle on one of said parts outside one end of the casing, a spraying nozzle carried by the other part of the stem outside the other end of the casing, said nozzle directed substantially at right angles with the stem, a fuel channel in the part of the stem carrying the nozzle, and a non-return valve in said passage.

2. A fuel injecting device for internal combustion engines, comprising a sleeve-shaped casing having a fuel inlet between its ends, a stem rotatably mounted in said casing, said stem comprising two parts lying in alinement, a connection between said stem parts to allow relative longitudinal displacement thereof while preventing them from rotation relatively to each other, said parts projecting beyond opposite ends of the casing, a spraying nozzle carried by the projecting end of one of said parts so as to extend substantially at right angles thereto, a handle carried by the projecting end of the other part, sealing surfaces on said parts at opposite sides of said fuel inlet, seats formed in said casing engaged by said sealing surfaces, and a spring inserted between the parts to press their sealing surfaces against said seats.

In testimony whereof I have signed my name.

NILS JOHAN ENOCH HELLSTRÖM.